April 4, 1944.  C. D. WILLSON  2,346,123
SUSPENSION SYSTEM FOR VEHICLES
Filed May 20, 1941   3 Sheets-Sheet 2
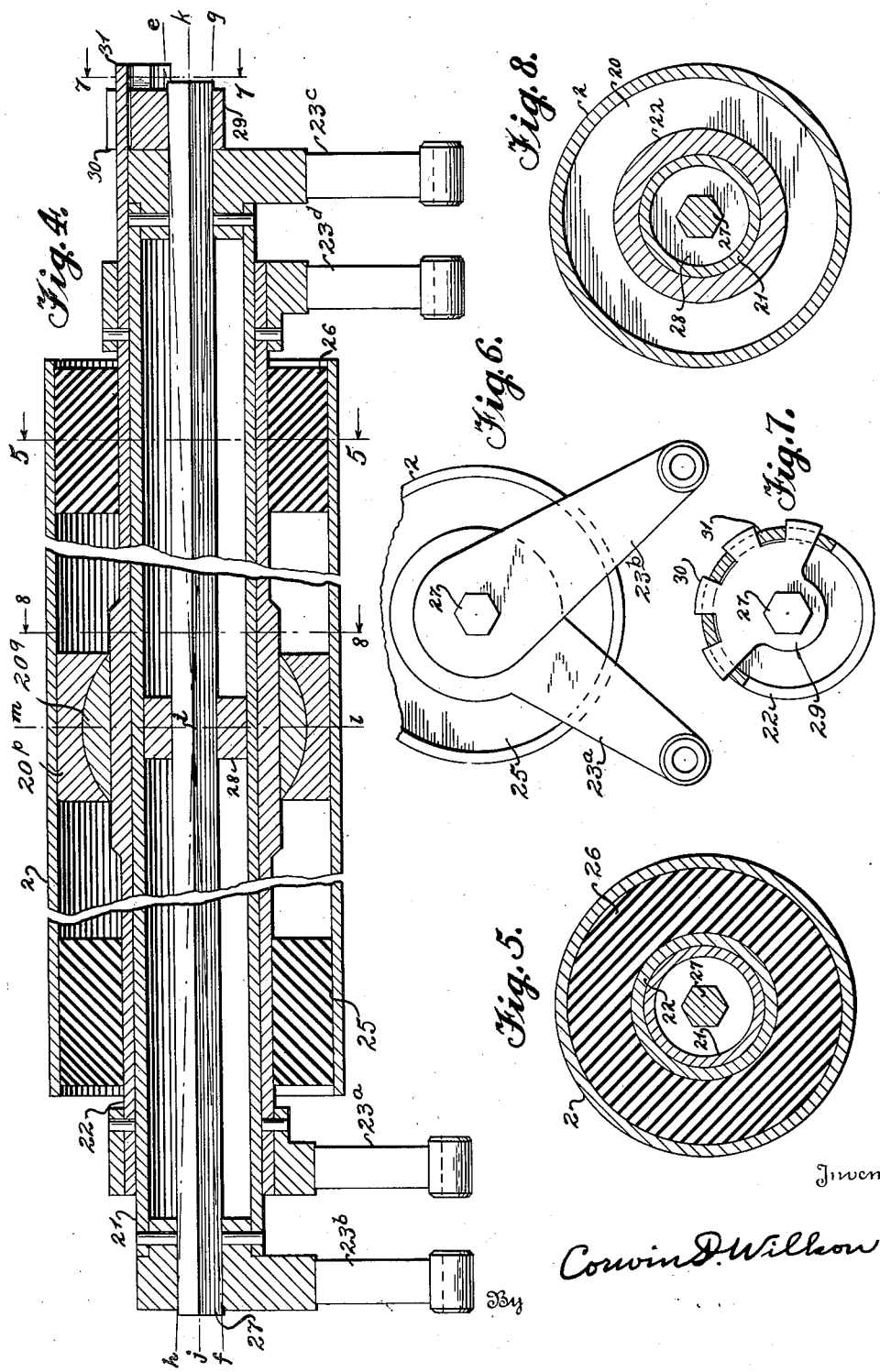

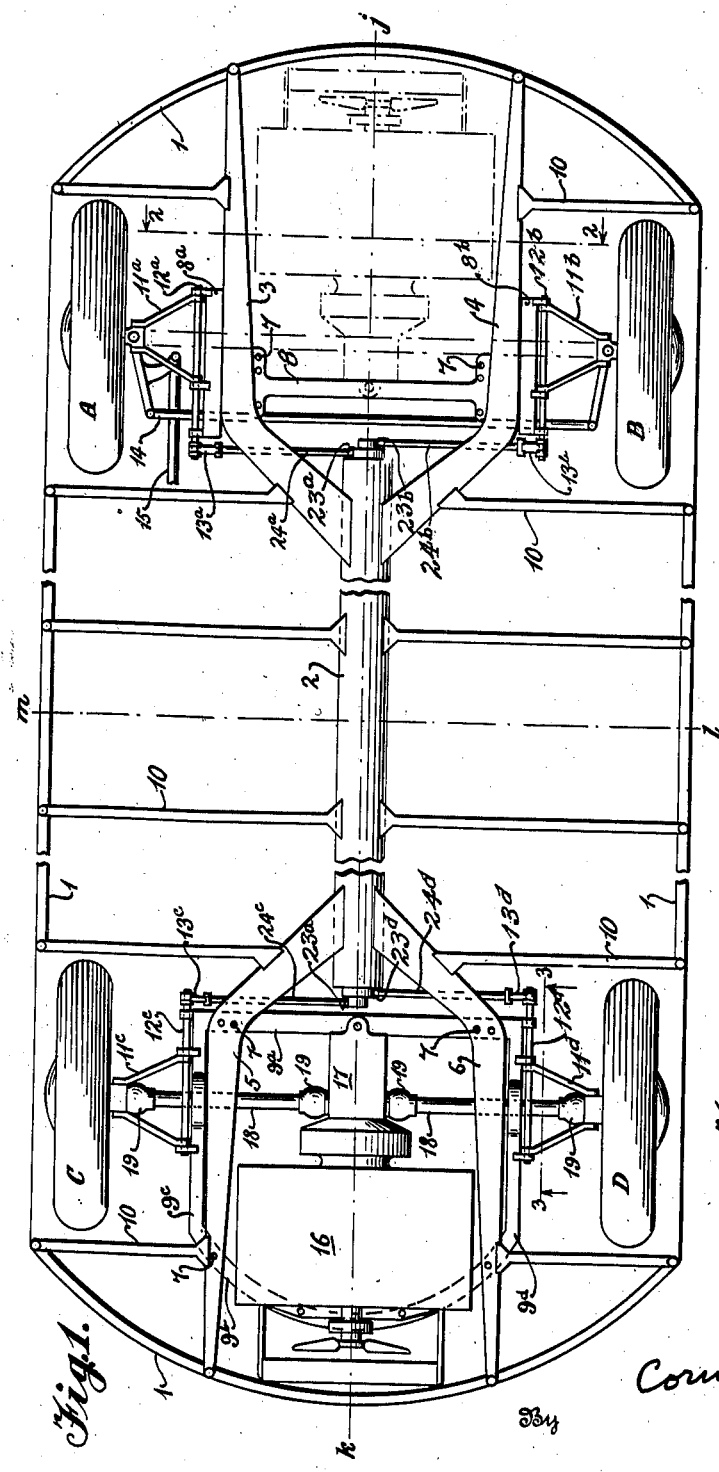

April 4, 1944.  C. D. WILLSON  2,346,123
SUSPENSION SYSTEM FOR VEHICLES
Filed May 20, 1941  3 Sheets-Sheet 3
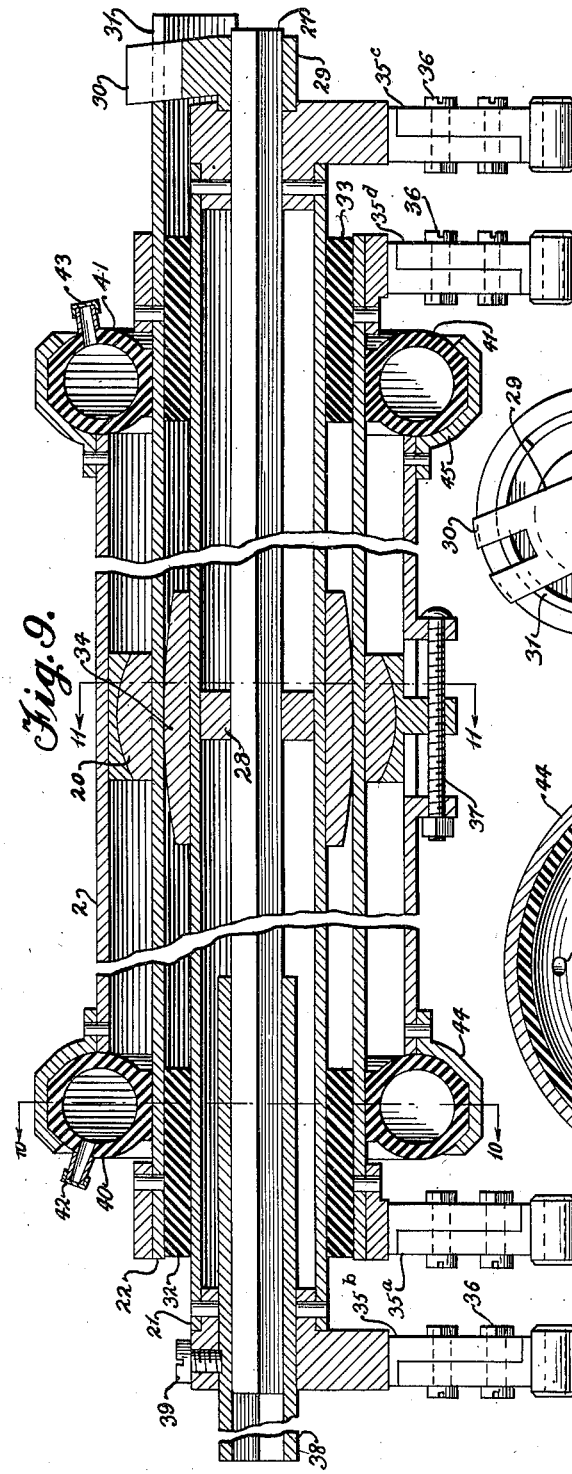
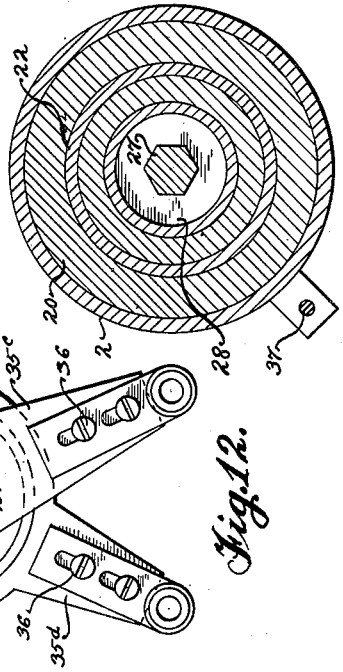
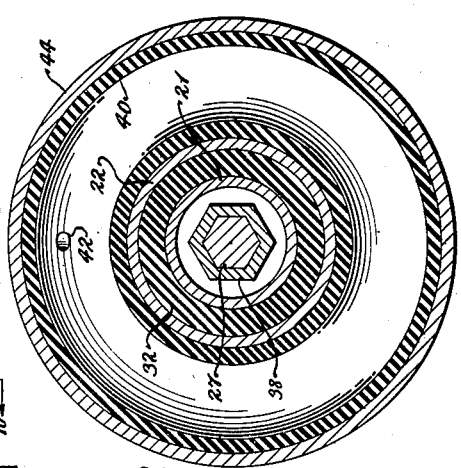
Inventor
Corwin D. Willson Patented Apr. 4, 1944

2,346,123

UNITED STATES PATENT OFFICE 2,346,123

SUSPENSION SYSTEM FOR VEHICLES

Corwin D. Willson, Flint, Mich.

Application May 20, 1941, Serial No. 394,373

22 Claims. (Cl. 280—104)

This invention relates to improvements in suspension systems for vehicles. This invention is a continuation in part of my Patent No. 2,251,698, August 5, 1941.

By this invention and the above-mentioned related invention, I have provided an entirely new system of supporting a vehicle and load thereon in such manner that the load is supported independently of the springing.

One object of the invention is a system of linkages between the wheels of a vehicle supporting the body load on even ground wholly off the resilient means. (Resilient means, as here used, excludes the tires of the road wheels.)

Another object of the invention is a suspension means supporting the wheels of a vehicle against vertical displacement on even ground, while permitting and yieldably resisting relative vertical displacement on uneven ground.

Another object of the invention is the provision of resistance to body torque by automatic mechanical means within the linkages supporting the body.

Another object of the invention is the construction of a suspension of the road wheels of a vehicle in such a manner that, at high speeds, the suspension means tends to bear primarily as a unit upon the point of least body movement and to eliminate "unsprung weight."

Another object of the invention is the stabilization of the vehicle body by linkages between the wheels diagonally and transversely of the body, the linkages comprising individually rigid, non-resilient elements.

Another object of the invention is a suspension system whereby the parts of a motor vehicle coactive therewith, such as the road wheels, wheel mountings, steering mechanism, power unit, driving means and controls, exclusive of the resilient means may be assembled upon the body as two integral units, one fore, one aft, so as to be easily demountable as units for replacement or repair, without interference with the body structure.

The above and other objects of the invention will be apparent as the description proceeds.

Previous wheel suspension systems have become refinements upon early applications of a resilient means between the road wheels and body load when rough roads traveled at relatively slow speeds required a maximum vertical wheel displacement to absorb the shock. These systems have one factor in common. All support the load by means of the resilient elements.

Today, in travelling at increasingly high speeds upon improved roads, the original conditions have changed so completely as to call for a change in the fundamentals of suspension design. In previous suspension systems, the springs have been positioned at points of most body movement and, to support the load, have had to be made correspondingly stiff, particularly if body stability was maintained. In my invention, the resilient means are positioned adjacent the points of least relative movement between the wheels and, not having to support the load, they may be extremely flexible; so flexible in fact, as to do away with violent spring recoil when released from sudden tension. Thus the need of an individual shock absorber for each wheel becomes unnecessary.

In its preferred form, my improved suspension means distinguishes from previous construction in that the static weight of the body, on even ground, is supported directly by and upon a system of linkages between wheels and body. As hereinafter more fully described, my improved suspension comprises a torque-resisting member between diagonally paired wheels that, in the language of kinematics, is the fixed link common to the linkages between wheels and body. As part of the torque-resisting member, a housing lies in one of the horizontal turning axes of the chassis. Mounted therein, upon a bearing that permits both rotary and lateral movements, are a pair of parallel elements, each supporting a front and a diagonally opposite rear wheel against simultaneous displacement in the same direction. Resilient means between the elements resist yieldably the vertical displacements of one pair of wheels so supported relative to the displacements of the other pair.

These and other novel features and objects of the invention are hereinafter more fully described and claimed and the preferred form of construction of a suspension means for a vehicle body or chassis is shown in the accompanying drawings, in which:

Fig. 1 is a plan view of the body or chassis frame and suspension means between the frame and the wheels.

Fig. 2 is a section taken on line 2—2 of Fig. 1 showing the front road wheels, wheel mountings, body frame, sub-frame and the front end of the suspension linkages.

Fig. 3 is a section taken on line 3—3 of Fig. 1 showing generally the character of the pivotal wheel mountings permitting relative displacement in a vertical plane.

Fig. 4 is a central longitudinal section of the improved suspension means as housed by the body backbone or chassis frame housing.

Fig. 5 is a section taken on line 5—5 of Fig. 4.

Fig. 6 is an end view in elevation of Fig. 4.

Fig. 7 is a section taken on line 7—7 of Fig. 4.

Fig. 8 is a section taken on line 8—8 of Fig. 4.

Fig. 9 is a longitudinal section of an alternate form of the suspension means.

Fig. 10 is a section taken on line 10—10 of Fig. 9.

Fig. 11 is a section taken on line 11—11 of Fig. 9.

Fig. 12 is an end view in elevation of Fig. 9.

The preferred construction of a suspension means for the purposes stated is shown in plan view in Fig. 1 in which the supported load, or body, is indicated at 1. The main supporting framework thereof, hereinafter as a whole referred to as the chassis, comprises a rigid torque-resisting mid-member shown on the plan at 2 as preferably of tubular form. This member, hereinafter referred to as the backbone of the body structure, and also as the chassis frame and suspension housing, is secured against torque at the forward end to a pair of rigid forking arms, 3 and 4, and at the rear end to another pair of rigid forking arms, 5 and 6. Detachably joined by fastening means 7 to the forward pair of forking arms, 3 and 4, is the cross-frame member 8, having side-extensions 8a and 8b, the said cross frame and its side extensions being hereinafter collectively referred to as the front subframe. Detachably joined by fastening means 7 to the rear pair of forking arms, 5 and 6, are the cross-frame members 9a and 9b having side extensions 9c and 9d, the said members 9a, 9b, 9c and 9d being hereinafter collectively referred to as the rear subframe. Joined to the parts of the chassis exclusive of the front and rear subframes: i. e., joined to the backbone 2 and to the pairs of rigid arms fore and aft, 3, 4, 5 and 6, are the transverse and subordinate structural body members 10.

A pair of front road wheels, A and B, respectively on the left and right of the driver, are pivotally mounted each at the opposite ends of cross frame member 8: wheel A upon extension 8a thereof and wheel B upon extension 8b. A pair of rear road wheels, C and D, are pivotally mounted each at opposite ends of cross frame member 9a: wheel C upon extension 9c thereof and wheel D upon extension 9d. Thus between wheels A and B and the front sub-frame are the respective wheel mountings 11a and 11b; and between wheels C and D and the rear subframe are the respective wheel mountings 11c and 11d.

As may be seen from Figures 1 and 2, each of the wheel mountings permits a wheel and the subframe adjacent to raise and lower in relative displacement in a substantially vertical plane upon passage of the vehicle over uneven ground. These mountings, for the most part, are so familiar and old in the art as to require no particularized description or numbering of their individual parts, except as hereinafter noted. In Figure 2, the wheel mounting 11a of wheel A is shown to consist of an upper and a lower bracket, indicated as x and y, pivotally connected to wheel support at one end and to subframe at the other. Fig. 1 shows the said brackets in plan and Fig. 3 shows similar wheel mounting 11d with upper and lower pivotal brackets x and y mounted upon the subframe member 9d by means of a pair of supports z, the upper bracket pivoting on shaft w and the lower bracket fixed to pivot shaft 12d. Each of the wheel mountings, 11a, 11b, 11c and 11d, has this same relative character, the lower bracket fixed to rotate its respective shaft 12a, 12b, 12c and 12d as the wheel mounted thereto, or the chassis frame adjacent, are displaced in a vertical plane relative to one another. To the said shafts are fixed arms 13a, 13b, 13c and 13d respectively, forming bellcranks, the purpose of which will be hereinafter described. In the drawings, bellcrank 13d is shown in Fig. 3 from the side; bellcranks 13a and 13b are shown in Fig. 2 from the front, and all four bellcranks are shown in plan in Fig. 1.

In the automotive vehicle construction here shown, the front wheels A and B are joined with a tie rod 14 so that each wheel may be guided simultaneously in the same direction by the pitman 15, connected to the balance of the steering mechanism (not shown). The power plant 16 and essential parts and controls including the driving means 17 are shown attached to the rear subframe, although these might be mounted between the front forking arms of the chassis without changing the fundamentals of the suspension means herein described. The driven wheels C and D, in the example illustrated, are joined to the driving means 17 by half axles 18 having universal joints 19 which permit relative displacement in a vertical plane of the rear wheels and rear subframe upon their respective pivotal mountings 11c and 11d.

In Fig. 2, the roadwheels A and B are shown so mounted that displacement in a vertical plane rotates the respective shafts 12a and 12b which causes the lower ends of the bellcranks 13a and 13b respectively fixed thereto to swing toward and away from the longitudinal center axis of the vehicle, indicated by the broken line j—k. The same relative structure causes the bellcranks 13c and 13d upon the rear wheel mountings to move in like manner under the vertical displacements of their respective wheels and adjacent chassis parts. The structure is such that the relative displacements of each wheel and its adjacent chassis part in a vertical plane may be controlled by the amount of force exerted on the lower end of each respective bellcrank. For example: with wheel A as fulcrum, force applied at the end of bellcrank 13a, pivoting on shaft 12a, will exert leverage to lift or lower the adjacent frame 8a according as the said force is toward or away from the longitudinal center axis j—k. The other wheels, B, C and D, being similarly mounted, will act similarly under forces applied at the ends of the respective bellcranks upon their respective wheel mountings. It thus becomes possible to connect the ends of the four bellcranks diagonally and transversely of the longitudinal center axis j—k with a system of linkages supporting the respective wheels against displacement in a vertical plane under increase of load evenly distributed between the wheels on even ground, while permitting relative displacements of wheels and adjacent chassis parts on uneven ground. Such a system of linkages will now be described.

As shown in Fig. 4, the chassis backbone 2 is also the suspension housing and a midpart thereof supports on a bearing 20 two parallel rotatable elements here shown as closely nested concentric tubes, the inner 21 and the outer 22 being each capable of both rotary and see-saw pivotal movements because of the character of the said bearing which is of two parts, the outer portion 20p having an inner radius into which the inner ringed portion 20q may rotate and oscillate simultaneously. When inner ring 20q supports the thickened portion of rotatable element 22 and the outer ring 20p is supported by the wall of the backbone 2 as shown, any force tending to draw the nested ends of tubes 21 and 22 at one extremity in one direction laterally is compelled by bearing 20 to see-saw the ends of the tubes at the other extremity in the opposite direction: in the same manner that the fulcrum under the leverage plank or rockerbeam of a child's teeter-totter compels the two ends of the rockerbeam to move under a given stimulus in simultaneously opposite directions. Moreover, lateral motion of the ends of tubes 21 and 22 may be in the direction of any radius of a circle centered on the longitudinal center axis line j—k.

Fixedly joined to opposite ends of rotatable elements 21 and 22 are the hubs of lever arms 23a, 23b, 23c and 23d, having eyed ends. Lever arm 23a is fixed to one end of outer tube 22 and lever arm 23d is fixed to the other end. Lever arm 23b is fixed to one end of inner tube 21 and lever arm 23c to the other end. Thus it becomes possible to connect front wheel A with the diagonally opposite rear wheel D and front wheel B with the diagonally opposite rear wheel C in the following manner. Between the eyed end of bellcrank 13a on pivotal wheel mounting 11a of wheel A and the eyed end of lever arm 23a is the connecting link 24a shown in Figures 1 and 2. Similarly the eyed ends of bellcranks 13b, 13c and 13d and the eyed ends of lever arms 23b, 23c and 23d are respectively connected with connecting links 24b, 24c and 24d. Thus the parts connecting wheel A with wheel D are: 11a, 12a, 13a, 24a, 23a, 22, 23d, 24d, 13d, 12d and 11d, each part individually rigid and non-resilient. Wheel B is similarly linked with wheel C, each link individually rigid and non-resilient. Through these linkages, not only are the wheels linked in diagonal pairs but front wheel A is linked with front wheel B and rear wheel C is linked with rear wheel D with individually rigid, non-resilient links.

The backbone 2 is positioned in the longitudinal axis of the chassis turning movement indicated by the line j—k. The bearing 20 has one axis coincidental with this axis j—k and is positioned upon the transverse axis of the chassis turning movement indicated by the broken line l—m. The intersection of lines j—k and l—m is thus the point of least chassis backbone movement over uneven ground. This point i serves as the center of the radius in bearing 20 as previously described and the bearing supports and restrains the rotatable elements 21 and 22 to pivotal movements within the lines e—f and g—h. On even ground the loading on the system of linkages forward of bearing 20 is designed exactly to counterbalance the loading thereon aft of the bearing. The force exerted by the portion of the body load on the lower end of bellcrank 13a in a direction away from the longitudinal axis j—k and tending to rotate element 22 through lever arm 23a in one direction is equal to the force exerted by the portion of the body load on the lower end of bellcrank 13d in a direction away from the axis j—k tending to rotate element 22 through lever arm 23d in the contrary direction. Similarly, the force exerted on the lower end of bellcrank 13b is equal to the force, tending to rotate element 21, exerted on the lower end of bellcrank 13c.

The tendency of the force at the lower end of bell-crank 13a to draw the forward end of rotatable element 22 laterally toward wheel A is resisted, through the concentric hubs of elements 21 and 22 and through the equilibrium already described as existing at the ends of lever arms 23a and 23b, by an equal force at the lower end of bellcrank 13b tending to draw the forward end of element 21 toward wheel B. Similarly, the tendency of the force at the end of bellcrank 13d to draw the rear end of rotatable element 22 laterally toward wheel D is resisted, through the concentric hubs of elements 21 and 22 and through the equilibrium described as existing at the ends of lever arms 23c and 23d, by an equal force at the lower end of bellcrank 13c, tending to draw the rear end of rotatable element 21 toward wheel C.

In other words, the forces tending to displace the chassis parts adjacent all four wheels being in exact equipoise on even ground under a balanced load, no displacement is possible. Under such conditions, the entire static load is supported upon the system of linkages between the wheels. Adding to the load under balanced distribution between the wheels can cause no relative displacement of the body relative to the wheels on even ground. Under these conditions, whatever the static load, it is supported by the linkages between the wheels comprising individually rigid, non-resilient elements; whereas, in the previous art, in linkages between the wheels and body, the linkages have comprised resilient elements.

In traversing uneven ground, however, the conditions are changed. The forces exerted on the ends of the respective bellcranks are thrown out of equipoise: i. e., the balance is upset. Under such conditions, relative displacements of wheels and adjacent chassis parts occur upon the pivotal wheel mountings.

For example, when wheel A passes up over a bump, the linkage between it and wheel D, the linkage between wheel A and B and the linkage between wheel D and C all go into action simultaneously. Each of these linkages has as a common fixed link, the backbone suspension housing 2 rigidly holding the moving links of the linkages to compensatory movements. As wheel A lifts, element 22 tends to rotate. This tends to displace wheel D downward and to lift chassis part 9d adjacent. But at the same time, upward displacement of wheel A tends to draw the front end of rotatable element 22 toward wheel A. On bearing 20, element 22 tends to pivot so that its rear end moves toward wheel D, thus easing wheel D and adjacent chassis part 9d of a portion of the tendency to displacement that otherwise would be compelled by the rotation of element 22 just described. At the same time, as upward displacement of wheel A tends to draw front end of rotatable element 22 toward wheel A, element 21 nested close inside element 22 tends to be drawn toward wheel A which tends to displace wheel B downwardly and lift the chassis part 8b adjacent. To the extent that wheel B and chassis part 8b resist this tendency to displacement, element 21 tends to rotate to displace wheel C downward and the chassis part 9c upward. But the rear end of element 21 being nested close inside element 22, which has tended to move toward wheel D, also tends to move toward wheel D, easing wheel C and adjacent chassis part 9c of part of the tendency to displacement. The shock accompanying the initial upward displacement of wheel A thus travels around the chassis in two directions: (1) from wheel A diagonally to wheel D and transversely to wheel C and in one series of reactions; (2) from wheel A to wheel B to wheel C in another series of reactions. And in each of these series of reactions the initial energy which, if concentrated upon chassis part 8a would cause shock, is dissipated and diffused.

The consequence is: Each localized tendency to shock is spread throughout the suspension system between the wheels. What otherwise might be shock from the displacement of one wheel going up over a bump is turned into to down movement of the other three wheels. Thus each such shock has four tires under it and otherwise tends to be damped by being pitted against simultaneous necessary compensatory movements of the linkage system under the displacements of the other wheels. By pitting tendency to shock at one point against tendency to shock at another, the forces tend to cancel out in the linkage movements, such as are not absorbed into the resilient means between some of the linkage elements.

The resilient means have not yet been described merely to stress how comparatively unessential they are as supports or connectors in my suspension system relative to the part they play in previous art. The resilient means in the suspension system being here described could be completely left out and the linkages would support the wheels on even ground under a balanced load without displacement and permit relative displacement upon uneven ground. By placing a shock-absorber between the ends of lever-arms 23a and 23b and one between the lever-arms 23c and 23d, yieldable resistance to the linkage action could be had without the use of other means whatsoever. But resilient elements are included in my suspension system to provide a yieldable resistance to such relative displacements of wheels and adjacent chassis parts as the linkages support in passage over uneven ground.

The shocks and vibrations arising from wheel displacements in traversing an improved highway at high speed occur at no two points simultaneously with the same force in the same direction. My suspension system is thus designed to absorb shocks of varying degrees of force from the swiftly alternating displacements of all the road wheels, to pit them against one another in a unitary system of linkages and to diffuse the residue widely as compared with the previous art where the localized shock from each wheel goes through a stiff load-carrying spring into the immediate chassis and remains localized. In my suspension system, with the static loading off the resilient elements, these may be of very flexible materials, forms and dimensions, and may be placed at points of minimal movement where there is time to damp high frequency vibrations.

As may be seen in Fig. 4, the space between backbone 2 and concentric rotatable elements 21 and 22 provides a housing away from exposure to the elements for the resilient spacers or bushings 25 and 26. These may be of rubber or rubber-like material, soft enough to permit but yieldably resist relative see-saw and turning movements of both backbone and outer concentric tube as these movements occur in passage over uneven ground. On even ground these bushings are under no stress, yet on uneven ground, each bushing cushions the lateral movements of both ends of the two rotatable elements simultaneously within lines e—f and g—h.

Splined to the hub of lever arm 23b is one end of a spring steel rod 27 which passes through a spacer 28 free to rotate within tube 21. Rod 27 also passes freely through the hub of lever arm 23c but is splined to a hub 29 having teeth 30 engaging slots in an extension 31 of rotatable element 22. As hub of lever arm 23b fixed to tube 21 rotates in one direction, to the extent that the opposite end of spring rod 27 is held against rotation, the rod twists and yieldably resists the rotation. If tube 22 rotates, to the extent that the opposite end of spring rod 27 is held against rotation, the rod twists and yieldably resists the rotation. Neither concentric tube 21 and 22 can thus rotate relative to the other without tensing and twisting spring rod 27, so that through the spring rod each tube resists the relative rotation of the other yieldably. Since there is opportunity in the backbone for the spring rod 27 to be long, it can be flexible; and since on even ground it is unloaded, it is as effective twisted in one direction as the opposite one. It also is housed out of the weather.

Any relative displacement in a vertical plane of a road wheel or the chassis part adjacent, as it rotates elements 21 and 22 will be yieldably resisted by the spring rod 27 and as they pivot upon bearing 20, elements 21 and 22 will be yieldably resisted by the resilient bushings 25 and 26.

Figure 9 shows in longitudinal section an alternate form of the suspension means. The backbone 2 houses the two rotatable elements 21 and 22 which are mounted for pivotal and rotary movements upon bearing 20. In this design elements 21 and 22 are not closely nested as in Fig. 4 but are spaced at their ends by resilient bushings 32 and 33 and at their midportions by bearing 34. The object of this alternate form is to permit elements 21 and 22 to pivot relative to one another on bearing 34 and against bushings 32 and 33. Lever arms 35a, 35b, 35c and 35d are linked with the respective bellcranks 13a, 13b, 13c and 13d as described for the preferred design. The difference is that each lever arm as shown in Figures 9 and 12 is extensible by means of screws 36 so that the relative load carried by the linkages on one side of line j—k or the line l—m may be adjusted to equalize the load carried on the respective opposite sides thereof by lengthening the lever-arms where necessary. Adjustments in the position of bearing 20 may be effected by screw 37. Turning of the screw in one direction moves toward the bearing; turning it in the opposite direction moves it aft. Thus under loading that might create a permanent unbalance in the equipoise of the suspension linkages, such as the addition of a custom-built body to a stock chassis, the main bearing of the linkage system may be brought into the transverse turning axis of the vehicle.

Another difference between the designs illustrated in Figures 4 and 9 is: as shown in Fig. 9, by means of an extensible spline sleeve 38, controlled by screw 39 in hub of lever arm 35b, the relative length and strength, hence the relative timing of spring rod 27 may be made more or less as desired to accommodate the spring tension and timing to changes in body load. (As in busses or trucks, where the spread is considerable.) If screw 39 is loosened, the extensible sleeve 38, which is a hexagonal spring steel tube fitting about the hexagonal rod 27 with what is known as a slip-fit, may be pushed in about rod 27 so as relatively to strengthen it and shorten it; or the sleeve may be drawn from about rod 27 and the opposite result be achieved.

Similarly, the hardness and strength of the resilient elements resisting the relative pivotal movements of rotatable elements 21 and 22 and backbone 2 may be altered to suit the load carried, or to change the softness of the ride. The resilient bushings 25 and 26 of the preferred design, in Fig. 9 are shown as pneumatic donuts 40 and 41, inflatable and deflatable to secure the desired pressure by valves 42 and 43 and held in place by extensions 44 and 45 to ends of backbone 2.

It will be understood that any of these four variants shown in Fig. 9 may be used separately or in any desired combination.

Aside from these adjustments, the suspension means shown in Fig. 9 differs from my Patent No. 2,251,698 in that tube 21 has a bearing upon tube 22 which has a bearing upon the housing. Since tubes 21 and 22 are spaced by resilient bushings 32 and 33, the design shown in Fig. 9 has more potential resilience than the preferred design shown in Fig. 4 which supports the load on even ground wholly off the resilient means.

Not the least of the advantages of this suspension is its resistance to body torque. Its main chassis structural members run from each wheel to the diagonally opposite wheel through the longitudinal turning axis of the chassis. The linkages housed therein resist body torque by mechanical means. When road wheel A lifts over a bump, the chassis adjacent in previous art has lifted and twisted the chassis, to resist which the structural members had to be made very bulky and heavy. In my suspension system, when road wheel A lifts and the chassis adjacent tends to do so, the mechanical linkage between the bellcrank 13a on the mounting of wheel A, with bearing 20 as a fulcrum, causes bellcrank 13d on the mounting of wheel D to apply leverage to lift the chassis adjacent to wheel D and thus relieve the tendency to twist the body structure. If road wheel A sinks into a depression and the adjacent chassis frame tends to drop and twist the body, the same linkage in the same manner releases the chassis adjacent wheel D enough so that it too tends to drop. The linkage supports the body parts adjacent diagonally opposed wheels from simultaneous vertical displacements in opposite directions, thus relieving the tendency to torque upon the body and making a lighter structure possible.

The same linkage system stabilizes the body. In the previous art, body stability has been in inverse ratio to spring flexibility and as springs have become softer to adapt them to improved roads taken at high speeds, the body has had to be stabilized with special means. In my preferred design, with all the static load carried by the linkages between the wheels, body stabilizing is not only made automatic in a manner that relieves body torque, it is made so independently of the flexibility of the springing.

At high speeds the body of a vehicle develops enough momentum for the parts of the suspension to move as if suspended to it. Thus the aim in the previous art has been to lighten the moving parts below the body momentum and the spring supports for the body: i. e., minimize "unsprung weight." In my suspension at high speed, the linkages function as if suspended from the point of least body movement and since there can be no relative displacement of a wheel or adjacent body part that does not pivot the elements of the linkages like a teeter-totter on bearing 20, and since the weight on one side is in counterbalance with the weight on the other, to spring one side, springs the other and unsprung weight entirely disappears from my suspension. Parked on even ground there is no weight sprung; in motion on uneven ground there can be no weight of wheels, suspension or body unsprung.

It is thus seen that the suspension described supports the body at rest and the wheels and body in motion in a way wholly different from the previous art. The manner of its absorbing shock is also different: a manner that is best described as "diffusion by linkage compensation." This means that no movement can take place in one part of the system of linkages without compensatory adjustments to that movement being compelled throughout the entire system of linkages. The initial movement may be considerable, yet the system of linkages will absorb it by a large number of minimal movements in compensatory adjustment over a wide area instead, as in present art, by maximum movement within a localized and limited area.

Thus the suspension acts as a unitary system of linkages about a fixed link in receiving, cancelling out, equalizing, damping and diffusing throughout the chassis the rapid succession of localized shocks upon each wheel of a vehicle and adjacent body parts. The stresses set up in the extremities tend to be brought in two directions around the chassis and in the movements of the linkages and the resistance of the resilience means effectively neutralized. Because the linkages are designed in their basic conception for equipoise, they tend to return to equilibrium as soon as possible. Being positioned adjacent the points of least movement consequent upon relative wheel and body displacements, the resilient means are where they can yieldingly resist both the up and down displacements of both body and wheels within the limits of minimum space and time.

The drawings being illustrative only, are more or less diagrammatic in character and it is to be observed that various changes in the form of the pivotal wheels mountings, for example, or the reshuffling of elements now in one turning axis of the chassis into another to achieve like results, or the manner of attaching the cross frame chassis members, or changes in other parts of the mechanism may be made without departing from the spirit and scope of the invention as set forth in the appended claims.

Having thus fully described my invention, its utility and mode of operation, what I claim and desire to secure by Letters Patent of the United States is:

1. For and in a mobile body, a load-bearing linkage comprising a frame, a housing rigidly supported by the frame, mountings for the rotation and relative vertical displacement of roadwheels fore, aft and on opposite sides of the housing, and fulcrum supported in and by the housing, a rockerbeam, a rigid midportion thereof supported upon said fulcrum, and lever arms linking opposite ends of the rockerbeam with mountings for said roadwheels.

2. For and in a vehicle, a tubular backbone, supports therefor against torque between diagonal pairs of roadwheels, said supports comprising suspension links in a system of linkage between said roadwheels and a common fixed point of operative support on a midpart of said backbone for an element of said linkage, said fixed point comprising a fulcrum of rigid material and said element comprising a tubular rockerbeam, a midportion strengthened to resist transverse and longitudinal distorsion upon said fulcrum.

3. For and in a vehicle, a body frame between a pair of front and a pair of rear wheels, a pivotal mounting for each wheel upon said frame, said mounting comprising a rigid lever arm and means attached to said arm adapted to exert leverage to displace part of said frame relative to the adjacent wheel; a linkage between one end of each lever arm on each front wheel mounting and one end of each lever arm on each rear wheel mounting, said linkage including a rockerbeam more resistant to bend and twist in a midportion than adjacent opposite ends; and a fulcrum rigidly supported by a midpart of said frame and rigidly supporting for rocking and turning movement said midportion of said rockerbeam.

4. For and in a vehicle, a chassis including a housing in one turning axis thereof, mountings for a pair of front and a pair of rear roadwheels on opposite sides of the chassis, a system of linkage between said mountings and said chassis to counterbalance paired wheels against relative vertical displacement under balanced load on even ground and for displacement under unbalanced load on uneven ground: said system including a rockerbeam, means linking opposite ends of the rockerbeam with said wheel mountings in counterbalanced pairs diagonally of the chassis and directly from wheel to wheel; a solid fulcrum supported by said housing and supporting a solid midsection of said rockerbeam for seesaw movement relative to said housing.

5. For and in a vehicle, a body, roadwheels for the support of laterally opposite front and rear extremities of the body, a pivotal mounting for each of said roadwheels upon the body, each said mounting part of a common linkage adapted to permit and prevent relative vertical displacements between said roadwheels and adjacent body parts according as said roadwheels rest on even ground or rotate over uneven ground; said linkage comprising a fulcrum of rigid material rigidly supported at a mid point between diagonal body extremities and supporting for turning movements relative to both transverse and longitudinal turning axes of the body, a rockerbeam in the same vertical plane as one of said axes.

6. For and in a vehicle, a body, a lightweight body frame comprising a midpart enclosing space lying in the same vertical plane as the longitudinal center axis of the body and supported against torque by rigid arms directly affixed to end extremities of the frame; said midpart operatively supported by and between diagonal pairs of roadwheels by suspension means permitting and preventing relative vertical wheel and frame displacements; said suspension means comprising a mounting for each of said roadwheels, each mounting linked to an element of a linkage housed in said midpart, a bearing of rigid material between said midpart and a midportion of said element, said bearing adapted to hold opposite ends of said element in equipoise on even ground and to restrain said ends to seesaw and rolling movement in passage over uneven ground; and resilient means so positioned between contiguous parts of said linkage as to be put under yielding stress in passage over uneven ground and under zero stress on even ground.

7. For and in a mobile body, a chassis comprising a hollow midpart, rigid supports against torque for said midpart between diagonal side and end extremities of the chassis; a pair of front and a pair of rear roadwheels, parts supporting the rotation of said wheels, a system of linkage between said parts and said midpart of said chassis, said system comprising a tubular rockerbeam and a rigid fulcrum housed in said midpart, said fulcrum rigidly supported by said midpart and supporting the rigid midportion of said rockerbeam to provide a structure whereby relative displacement of any one roadwheel or adjacent chassis part in a vertical plane rotates and tilts one end of said rockerbeam to apply leverage compelling compensating displacements of the other wheels and chassis parts within the limits of the total linkage action; and means on opposite sides of said fulcrum yieldably resisting the compensating action of the linkage.

8. In a vehicle, a body, a torque-resisting body backbone between pairs of front and rear wheel mountings, a body-supporting linkage between one of said mountings on one side of one turning axis of said backbone and one of said mountings on the opposite side of said axis; integrating means linking said linkage with another similar body-supporting linkage between the mountings of the other two wheels: said integrating means comprising a rigid fulcrum supported by, on and within said backbone and two rotatable elements mounted to seesaw upon said fulcrum, one said element within complete lateral constraint of the other and both within partial lateral constraint of said backbone.

9. In a vehicle, a body, roadwheels for the operative support of laterally opposite front and rear extremities of the body, and a linkage of individually rigid elements between body and wheels, said elements comprising parts supporting the rotation and pivotal vertical displacement of said roadwheels, a body frame, a fulcrum on said frame at a midpoint between said extremities, and a rockerbeam housing a rotatable tube and laterally mounted to pivot upon said fulcrum; and resilient means outside said body-supporting, wheel-supporting linkage on even ground yieldably resisting relative body and wheel displacements in passage over uneven ground.

10. In a mobile body, a load-bearing frame including a hollow midmember between a pair of front and a pair of rear road wheels, said midmember rigidly supported against twist by arms fixed to opposite sides and to opposite ends of said frame, and said midmember operatively supported against twist by a suspension linkage operative by leverage between mountings for diagonal pairs of said roadwheels, said linkage comprising a hollow rockerbeam directly linking mountings for one of said diagonal pairs while rigidly supporting opposite ends of a rotatable element directly linking the other of said pairs; a bearing supported by said midmember and pivotally supporting for free rotation a compression-resistant midsection of said rockerbeam; said bearing positioned at such point relative both to said midmember and to said rockerbeam as to bring loaded opposite ends thereof into counterbalance in said linkage.

11. For and in a mobile body, a fulcrum of rigid material, a rigid support for the fulcrum between laterally and diagonally opposite body extremities, a mounting for each wheel of pairs of road wheels fore and aft, a rockerbeam comprising rotatable elements, one of said elements with stiffened midportion pivotally supported on said fulcrum, means holding the ends of said elements on one side of said fulcrum to mutual lateral movement and to independent rotary movement in linkage with mountings of one pair of said wheels, and means holding opposite ends of said elements to mutual lateral and to independent rotary movement in linkage with mountings of the other pair of said wheels; said fulcrum being so positioned relative both to said body extremities and to opposite ends of said rockerbeam as to bring forces operative thereon on opposite sides of said fulcrum into relative equipoise under balanced loading on even ground; and mechanical means for readjusting relation of parts essential to said equipoise when said parts in maladjustment throw said foces out of equipoise on even ground.

12. For and in a mobile body, a rigid bottom frame, pivotal mountings for a pair of front and a pair of rear wheels to permit relative wheel and frame displacements; a bearing of rigid material supported by a midpart of said frame; a laterally stiff and transversely solid midportion of a rockerbeam supported by said bearing for free clockwise and counterclockwise turning movements and for lateral rocking movements thereon; and rigid arms connecting opposite ends of said rockerbeam with said wheel mountings to support wheels and frame extremities against relative displacements under evenly distributed increase of load on even ground.

13. For and in a mobile body, a frame, mountings for pairs of front and rear wheels, a bearing supported by a hollow midpart of the frame, a pair of rotatable elements, the strengthened midsection of one housing the other and mounted on said bearing, opposite ends of both elements linked with said mountings, resilient means between said opposite ends and adjusting means for increasing or diminishing the degree of resilient resistance to relative rotation of said elements: said adjusting means comprising a single longitudinal torsion spring operatively connecting said elements by means of a spline sleeve extensible about said spring to vary the effective dimensions thereof and thereby the degree of resiliency, and fastening means for securing said spline sleeve in desired longitudinal position about said spring.

14. For and in a mobile body, a frame, mountings for pairs of front and rear wheels, a fulcrum supported by a hollow midpart of the frame, a longitudinal rockerbeam in said midpart, a strengthened midportion of said rockerbeam supported for seesaw movement upon said fulcrum, resilient means between opposite ends of said rockerbeam and the inner walls of said midpart yieldably to resist relative lateral movement therebetween, and means adjusting the degree of resistance of said resilient means: said adjusting means comprising pneumatic rings as such resilient means and valves for controlling the amount of inflation and deflation of said rings.

15. For and in a mobile body, a backbone between diagonal body extremities, mountings for pairs of front and rear roadwheels, a rockerbeam comprising two elements of a linkage connecting said mountings through said backbone, said elements mutually stiffened by one bearing laterally directly upon a lateral inside surface of the other, and means compelling relative vertical displacement of one of said wheels relative to the adjacent body part to exert leverage compensatingly to displace another of said wheels or the body part adjacent thereto: said means comprising a fulcrum in the form of a bearing between a midportion of said rockerbeam and a midpart of said backbone; and resilient means on one side of said bearing yieldably resisting relative movement of two links in said linkage on the opposite side of said bearing.

16. For and in a mobile body, a load-bearing frame comprising a hollow midpart lying in the same vertical plane as one horizontal turning axis of the frame and means eliminating unsprung weight from pairs of roadwheels mounted for relative vertical displacements fore and aft; said means comprising a rigid fulcrum positioned in the transverse and longitudinal turning axes of said midpart, some of said wheels operatively linked to one end of, and other of said wheels similarly linked to the opposite end of a rockerbeam; the midportion of the rocker beam supported for rock and roll upon said fulcrum and in such manner that weight of said wheels linked to one end of said rocker beam is in counterbalance with the weight of the other wheels linked to the opposite end of said rockerbeam; and means upon one side of said fulcrum yieldably resisting lateral movement of opposite ends of said rockerbeam in opposite directions simultaneously relative to said frame.

17. For and in a system of suspension, load-bearing parts relatively displaced in passage over an uneven surface: said parts comprising a torque-resistant frame, individual mountings for roadwheels fore, aft and on opposite sides of said frame, a fulcrum on a midpart of said frame, a rockerbeam a midportion laterally supported on the fulcrum, pairs of lever arms fixed to opposite ends of the rockerbeam, and connecting links operatively linking said lever arms with said mountings; each of said parts being rigid.

18. The structure in claim 17 with resilient means under yielding stress in passage over an uneven surface: said means being supported between two said parts, one positioned to move relative to the other in the linkage action.

19. For and in a wheeled body, a twist-resistant, space-enclosing body backbone, a fulcrum therein, mountings for roadwheels fore, aft and on opposite sides of the fulcrum, and elements of a system of suspension operative by leverage extending through said backbone and pivoted on said fulcrum and linking said mountings with said backbone for relative vertical displacement.

20. For and in a vehicle, a suspension comprising a rigidly supported housing, a fulcrum held in fixed relation to said housing, individual mountings for roadwheels fore, aft and on opposite sides of said housing, elements operative through said housing by leverage on said fulcrum and suspending said mountings for the relative displacement of said roadwheels, and resilient means on opposite sides of said fulcrum yieldingly resisting said leverage.

21. For and in a vehicle, suspension parts relatively displaced in passage over an uneven surface: said parts comprising a twist-resistant chassis, individual mountings for roadwheels fore, aft and on opposite sides of said chassis, a rockerbeam, pairs of lever arms fixed to opposite ends of said rockerbeam and linked with said mountings, and a fulcrum comprising a bearing having two rigid parts, one supported by a midpart of said chassis, the other supporting an intermediate portion of said rockerbeam for simultaneous rocking and rolling movement relative to one turning axis of said chassis.

22. For and in a system of suspension between a load-bearing frame and spaced roadwheels, an individual mounting for one of said roadwheels, a housing carried by said frame and having a fulcrum, a rotatable element supported on said fulcrum in said housing for simultaneous rocking and rolling movement relative to one turning axis of said frame, a lever arm one end fixed to said rotatable element and the opposite end operatively linked with said mounting, and resilient means in said housing yieldably resisting movement of said element relative to said axis when the roadwheel on said mounting passes over an uneven surface.

CORWIN D. WILLSON.